United States Patent [19]
Lewis

[11] Patent Number: 5,627,720
[45] Date of Patent: May 6, 1997

[54] POWER DISTRIBUTION BOX WITH SURGE SUPPRESSOR

[76] Inventor: Keith A. Lewis, 1700 Crisp Rd., Ennis, Tex. 75119

[21] Appl. No.: 514,191

[22] Filed: Aug. 11, 1995

[51] Int. Cl.[6] .................................................. H02H 3/22
[52] U.S. Cl. .......................... 361/118; 361/56; 361/627; 361/656; 361/663
[58] Field of Search .......................... 361/56, 91, 111, 361/118, 627, 628, 644, 647, 652, 659, 663, 656; 335/132, 202

[56] References Cited

U.S. PATENT DOCUMENTS

| | | | |
|---|---|---|---|
| 4,642,733 | 2/1987 | Schacht | 361/363 |
| 4,740,859 | 4/1988 | Little | 361/56 |
| 5,010,438 | 4/1991 | Brady | 361/56 |
| 5,053,916 | 10/1991 | Weekamp et al. | 361/308 |
| 5,204,800 | 4/1993 | Wasney | 361/111 |
| 5,394,296 | 2/1995 | Erickson, Jr. et al. | 361/659 |
| 5,412,529 | 5/1995 | Eaton et al. | 361/90 |

*Primary Examiner*—Jeffrey A. Gaffin
*Assistant Examiner*—Michael J. Sherry
*Attorney, Agent, or Firm*—Harris, Tucker & Hardin, P.C.

[57] ABSTRACT

A power distribution box is provided with built in surge suppression capabilities that can be service without interrupting power to downline circuits powered from the power distribution box. A socket is wired directly to the busses supplying power to the circuit breakers in the power distribution box. The socket is designed to accept a surge suppression module that can be removed and replaced while the electrical connections in the socket are "hot." To prevent accidental electrocution the electrical contacts of the socket are place below the surface of the socket. Additionally, the stab-in connectors of the socket and the corresponding stabs of the surge suppression module are arranged in such a way as to ensure that the module is properly polarized when inserted into the socket.

5 Claims, 3 Drawing Sheets

POWER DISTRIBUTION BOX WITH SURGE SUPPRESSOR

TECHNICAL FIELD OF THE INVENTION

The invention relates to power distribution boxes, and more specifically to power distribution boxes with surge suppression capabilities.

BACKGROUND OF THE INVENTION

Power distribution boxes, or panel boards, are used to provide electrical power to buildings and other installations. The incoming power lines are routed through the box and more particularly through the circuit breakers housed in the box. The circuit breakers direct the power from the power source to individual circuits inside the building or installation and provide some protection to the circuit by disconnecting the circuit from the power source when the circuit draws more current than it was designed for. In addition to the circuit breakers, the panel board can be expanded to hold other electrical equipment. Panel boards have been extended to house such things as shunt trips, relays, transformer and monitoring equipment.

Surge suppressors have also been added to circuit breakers to provide protection against voltage spikes and surges which are capable of damaging electrical equipment connected to the power distribution box. The surge suppressors protect against these voltage transients by absorbing the excess energy and slowly discharging it to ground. In order for this type of surge suppression to be effective the surge suppression circuitry must be located as close to the circuit breakers as possible because every 12 inches of conductor length between the circuit breakers and the surge suppressors results in 170 volts of let-through voltage, severely compromising the performance and effectiveness of the system.

Previous systems have located surge suppression modules in the panel board itself and wired the modules directly to the busses that distribute the power from incoming lines to circuit breakers. This arrangement provides very good surge suppression performance, but suffers from other drawbacks. The purpose of the surge suppression modules is to keep equipment downline operating without interruptions. However, in a system with surge suppression modules wired, or bolted to the power source, a problem with the module necessitates that power to the panel board and all downline equipment must be disconnected to replace or reset the module, resulting in the very interruption of power the surge suppression was designed to prevent.

To overcome this problem some panel boards have had their surge suppressors wired through one or more of the circuit breakers housed in the panel board. While this approach allows the particular circuit breakers to disconnect the surge suppressor module from the power source and allows the surge suppressor module to be serviced without interrupting power to the other circuit breakers it is an imperfect solution. Circuit breakers in panel boards are nearly always precious commodities, installing surge suppression that would monopolize multiple breakers could often be impractical or impossible.

SUMMARY OF THE INVENTION

One aspect of the present invention is to provide a power distribution box incorporating a surge suppression module which can be serviced or replaced without disconnecting power from the power distribution box and the downline equipment and without monopolizing precious circuit breakers. The surge suppression assembly is mounted adjacent to the circuit breakers in a panel board. The surge suppression assembly includes a socket and a surge suppression module. A surge suppression module is plugged into the socket with the socket being connected directly to the power source in parallel with the circuit breakers.

In another aspect of the invention a panel board is mounted in a building and houses and houses circuit breakers which distribute power from an incoming power source which can be a standard 3 phase power source. Power is distributed from the power source to the circuit breakers via a series a busses. A main bus is comprised of 3 lines from each of the 3 power lines to the appropriate breakers. A neutral bus connects the neutral line from the power source to neutral in the circuit breakers. A ground connection is also provided to electrically ground the panel board. The power received is distributed from the circuit breakers to individual circuits in the building into which power downline equipment.

The gutter in the panel board housing the circuit breakers is extended to accommodate a socket which is wired directly to the main bus, the neutral bus, and is connected to ground through the panel board. The socket is designed to accept a specially adapted surge suppression module. Although the electronics of the module are standard and well known, the package used to house the electronics is fitted with stabs configured along with the stab-in connectors of the socket to ensure proper polarization when the module is inserted in the socket. The package is also formed with an extended ledge on the face opposite the stabs to form a finger grip area facilitating insertion and removal of the module from the socket.

BRIEF DESCRIPTION OF THE DRAWINGS

Other objects and features of the invention will become more readily apparent from the following detailed description when read in conjunction with the accompanying drawings, wherein.

DETAILED DESCRIPTION

Referring now to FIGS. 1 to 6 a description of the preferred embodiment of the present invention is given.

Figure 1:
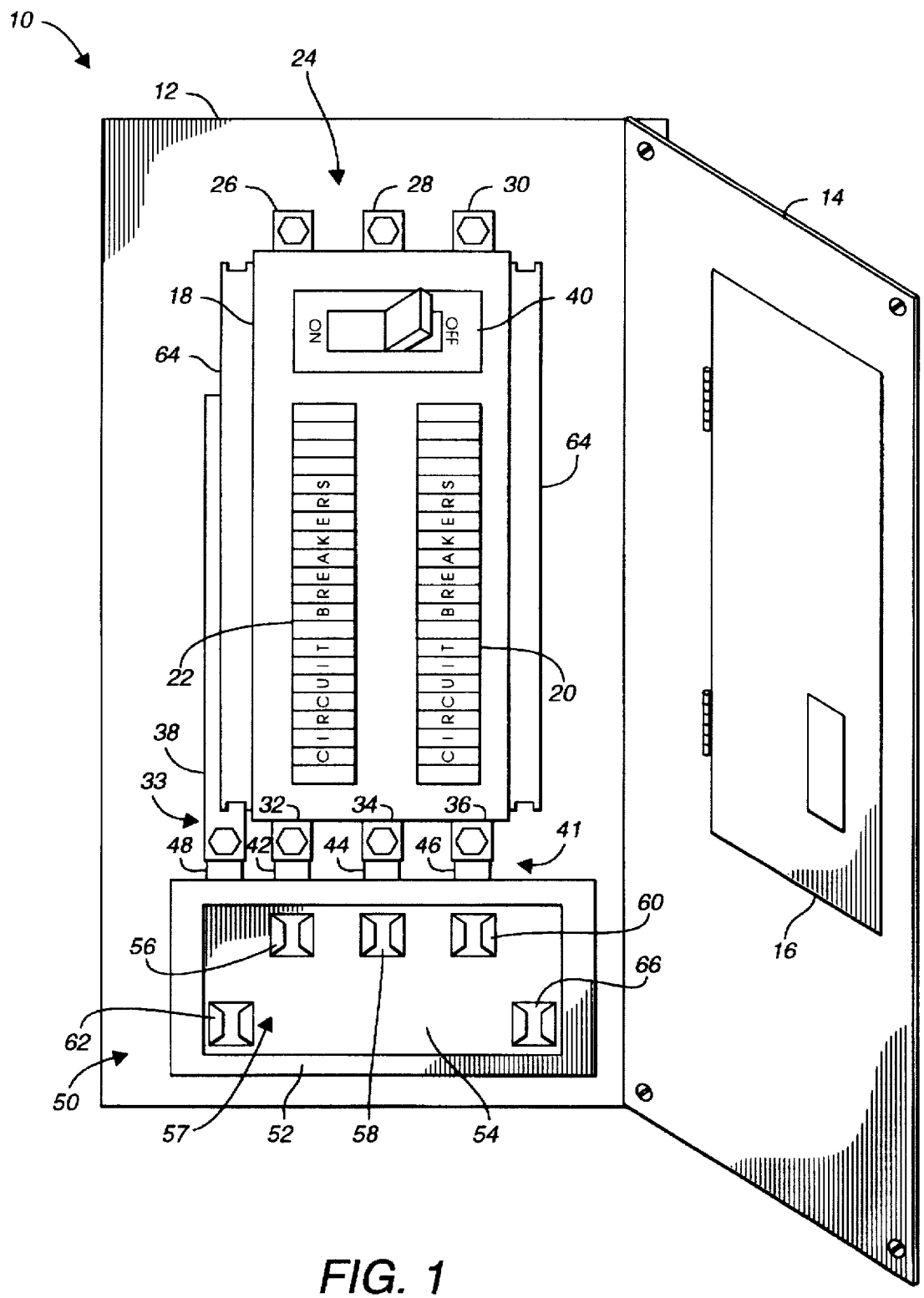
FIG. 1 is perspective view of a power distribution box incorporating the preferred embodiment of the invention.

A power distribution box 10 is shown in FIG. 1 adapted to incorporate the preferred embodiment of the present invention. Panel board 12 is mounted inside a building and houses circuit breaker module 18 which distributes power from a power source to individual circuits in the building. Circuit breaker modules and individual circuit breakers are well known and therefore will not be discussed in greater detail. Panel board 12 is covered by panel board cover 14 which is secured to the panel board 10 by screws or other removable fastening means. Panel board cover 14 includes access door 16 which provides easy access to circuit breaker module 18, otherwise, panel board cover 14 protects the other equipment and connections housed in panel board 12 while still allowing these components to be accessed by authorized service personnel.

Circuit breaker module 18 is held in panel board 12 by mounting strips 64 and includes multiple individual circuit breakers shown here arranged in row 20 and row 22. Master power switch 40 which removes the power from all circuit breakers in rows 20 and 22. The outside power source which is a standard 3 phase power source in the preferred embodiment, but can be any power source, is connected through power source connectors 24. Line A of the power source is connected to line A connector 26, line B of the power source is connected to line B connector 28, and line C of the power source is connected to line C connector 30. The power source also includes a neutral line which is connected to the circuit breaker module although the connection is not shown. The neutral line is connected to neutral bus extension 38. Power source connectors 24 feed power to the circuit breakers as is known in the art through a main bus.

Still referring to FIG. 1, socket 50 for receiving surge suppression module 70 is shown mounted in panel board 12. Surge suppressor module 70 is detailed in FIGS. 2, 3, and 4 Socket 50 includes rim 52 flush with panel board 12, and recessed area 54 to accept body 72 of the surge suppression module 70 as shown in FIG. 3. Socket 50 contains stab-in connectors 57. Line A stab-in connector 56, line B stab-in connector 58, line C stab-in connector 60, neutral stab-in connector 62, and ground stab-in connector 66 are arranged to ensure that surge suppression module 70 is properly polarized when inserted in socket 50. This is accomplished by mounting line A stab-in connector 56, line B stab-in connector 58, and line C stab-in connector 60 between and disposed off the line formed by neutral stab-in connector 62, and ground stab-in connector 66.

Circuit breaker module 18 includes bus extensions 33 to connect power from the power source to other equipment that can be housed in panel board 12. Socket 50 is fitted with mounting bars 41 designed to electrically connect stab-in connectors 57 with bus extensions 33. Consequently, line A bus extension 32 forms an electrical connection with line A mounting bar 42, line B bus extension 34 forms an electrical connection with line B mounting bar 44, line C bus extension 36 forms an electrical connection with line C mounting bar 46, and neutral bus extension 38 forms an electrical connection with neutral mounting bar 48. The direct connection of socket 50 to circuit breaker module 18 results in socket 50 being placed electrically in parallel with the circuit breakers of circuit breaker module 18. Also, since socket 50 is connected directly to bus extensions 33 without significant lengths of conductor, surge suppressor module 70 obtains its optimal performance characteristics.

Figure 2:
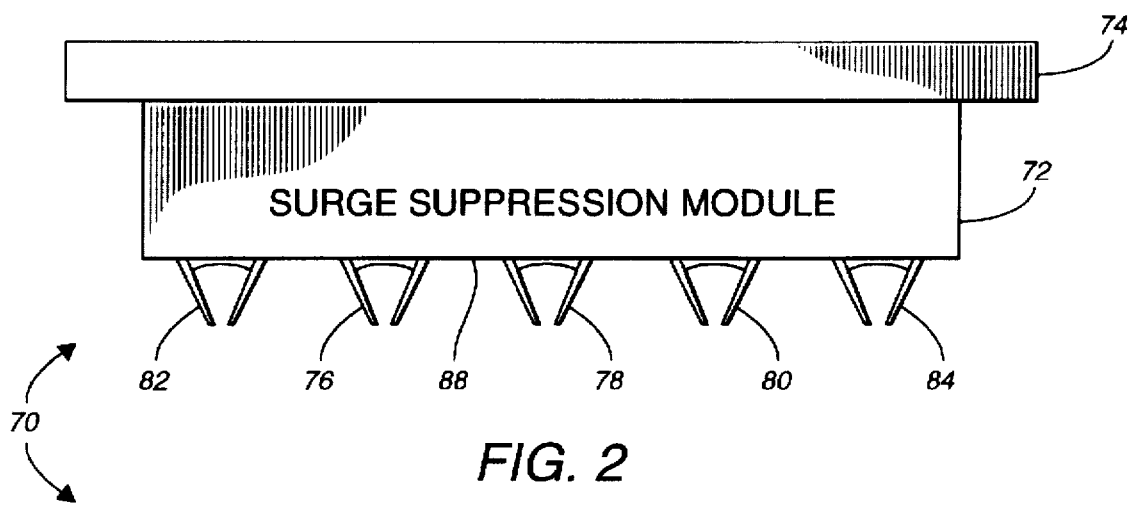
FIG. 2 is a side view of a surge suppression module used in the preferred embodiment of the invention.
Figure 3:
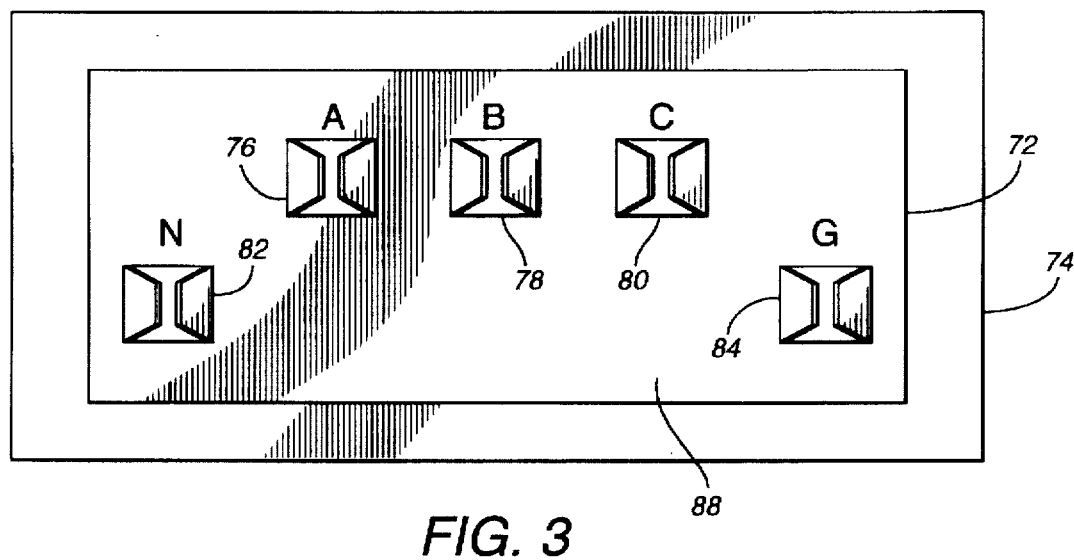
FIG. 3 is a bottom view of the surge suppression module of FIG. 2.
Figure 4:
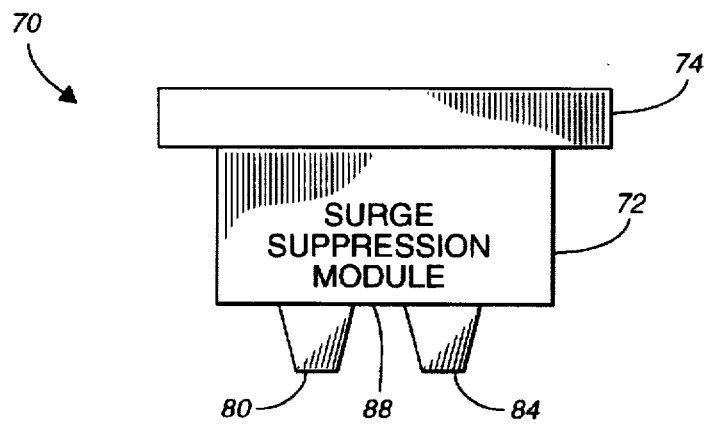
FIG. 4 is a short side view of the surge suppression module of FIG. 2.

Referring now to FIGS. 2, 3, and 4, the preferred embodiment of surge suppression module 70 is described. Surge suppression module 70 includes body 72 which is extended outward on all sides at one end to form finger grip ledge 74. Body 72 houses the electronics (not shown) to perform the actual surge suppression. Surge suppression module 70 is preferably a transient voltage surge suppressor with 200,000 peak transient current capability. Transient voltage surge suppression is well known in the art and the actual electronics in the module will not be discussed further. On surface 88 opposite finger grip ledge 74 are mounted stabs 76, 78, 80, 82, and 84 to connect surge suppression module across the power source via stab-in connectors 56, 58, 60, 62, and 66 shown in FIGS. 1, 5 and 6. Line A stab 76, line B stab 78, and line C stab 80 are mounted between and disposed from the line formed by neutral stab 82 and ground stab 84 in such a manner as to correspond with stab-in connectors 57 from FIG. 1.

Figure 5:
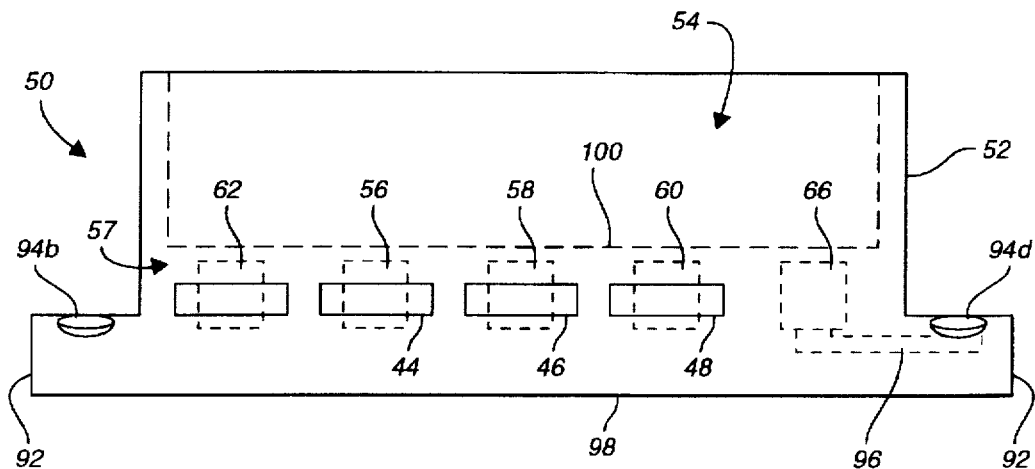
FIG. 5 is a side view of the socket or baseplate used in the preferred embodiment of the invention.
Figure 6:
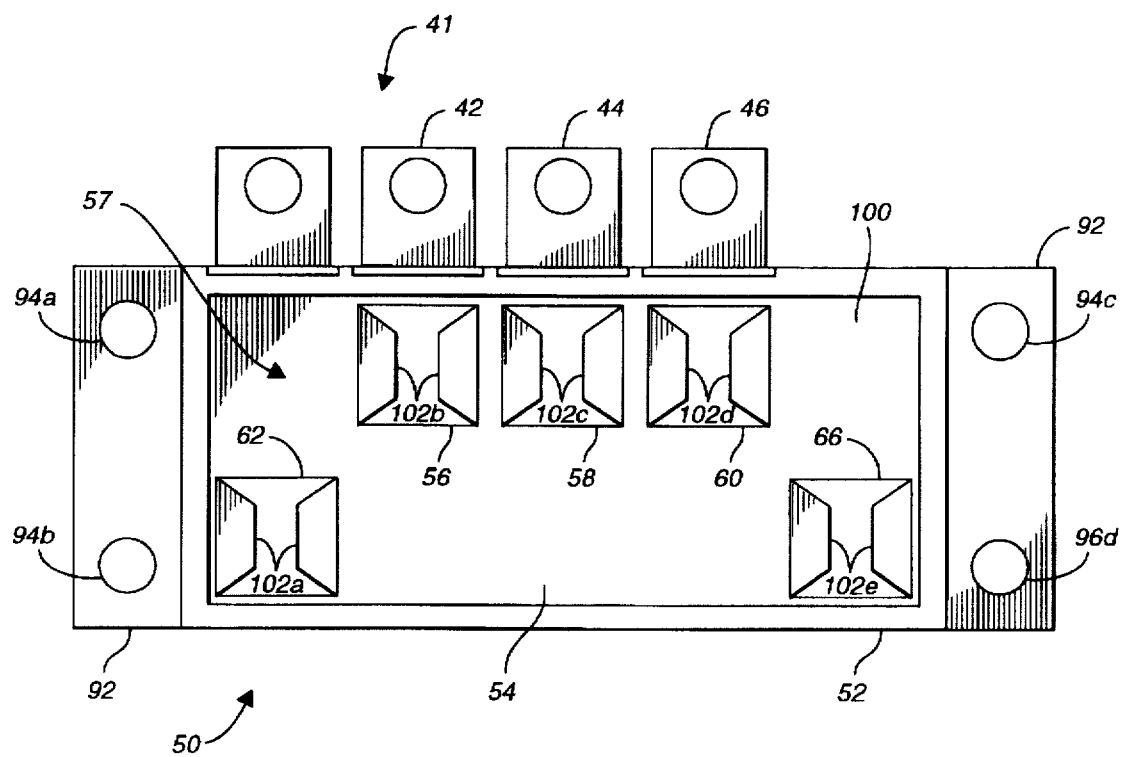
FIG. 6 is a top view of the socket or baseplate of FIG. 5.

Referring no to FIGS. 5 and 6, the preferred embodiment of socket 50 is described. Socket 50 includes base 98, rim 52, recessed area 54 formed by base 98 and rim 52, and mounting flange 92. Mounting flange 92 is used to mount socket 50 to panel board 12 by using screws inserted through mounting holes 94a–d. Stab-in connectors 57 are disposed in base 98 as discussed above. Bus extensions 33 extend into base 98 below bottom surface 100 of recessed area 54 all the way to stab-in connectors 57 forming an electrical connection. Since bus extensions 33 extend into base 98 below the level of bottom surface 100, the electrical connections 102a–e in stab-in connectors 57 are also set below bottom surface 100. With electrical connection 102a–d recessed as described chances of accidental electrocution while servicing the panel board are greatly reduced. Electrical connection 102e for ground stab-in connector 66 is also recessed, however since there is no bus extension for ground stab-in connector 66 ground connection 96 is made by electrically connection ground stab-in connector 66 with the grounded panel board. Ground connection 98 is electrically connected to panel board 12 from FIG. 1 by the screw in mounting hole 94d.

It should be understood that various modifications can be made to the embodiments disclosed without departing from the spirit and scope of the present invention. Various engineering changes and choices can also be made without departing substantially from the spirit of the disclosure.

I claim:

1. A power distribution box for connecting a power source to an electrical system in a building, comprising:

a panel board mounted in the building;

a plurality of circuit breakers housed in the panel board and electrically connected between the power source and the electrical system of the building;

a socket housed in the panel board and directly electrically connected in parallel with the plurality of circuit breakers, the socket including a stab-in connector for at least one power conductor, and a ground conductor, each of the stab-in connectors forming an aperture in a surface of the socket; and a surge suppression module to suppress an electrical surge in the power source, the surge suppression module including a stab for the at least one power conductor and the ground conductor, the stabs adapted to engage the corresponding stab-in connector in the socket thereby making an electrical connection, wherein the surge suppression module is removably inserted in the socket and when inserted in the socket is electrically connected to the power source in parallel with the plurality of circuit breakers.

2. The power distribution box of claim 1, wherein the power source is a 3 phase power source including three power conductors, and a neutral conductor and wherein the surge suppressor is adapted to suppress electrical surges on all three power conductors.

3. The power distribution box of claim 2, the socket further comprising a stab-in connector for a neutral conductor, the surge suppression module further comprising a stab for a neutral conductor, and wherein the electrical connection between the socket and the surge suppression module is made below the surface of the socket so as to prevent potential electrocution of a user.

4. The power distribution box of claim 1, wherein the surge suppression module is a high capacity transient voltage surge suppressor having a 200,000 amp peak transient current capability.

5. A power distribution box for providing power from a power line with neutral conductor and a power conductor to a structure with an electrical system, comprising:

- a panel board mounted in the structure and including a gutter;
- a plurality of circuit breakers mounted in the gutter of the panel board and electrically connected to the electrical system of the structure;
- a main bus electrically connected between the power conductor and the plurality of circuit breakers;
- a neutral bus electrically connected between the neutral conductor and the plurality of circuit breakers;
- a ground connection electrically connected between the panel board and electrical ground;
- a socket including a first stab-in connector electrically connected directly to the main bus, a second stab-in connector electrically connected to the neutral bus, and a third stab-in connector electrically connected directly to the ground connection;
- a surge suppression module removably inserted into the socket including a power stab, a neutral stab, and a ground stab wherein the power stab is adapted to make an electrical connection to the main bus when inserted into the first stab-in connector, the neutral stab is adapted to make an electrical connection with the neutral bus when inserted into the second stab-in connector, and the ground stab is adapted to make an electrical connection with the ground bus when inserted into the third stab-in connector, and wherein the surge suppression module is electrically in parallel with the circuit breakers and provides surge suppression for the electrical system of the structure.

* * * * *

UNITED STATES PATENT AND TRADEMARK OFFICE
CERTIFICATE OF CORRECTION

PATENT NO.   : 5,627,720
DATED        : May 6, 1997
INVENTOR(S)  : Keith A. Lewis It is certified that error appears in the above-indentified patent and that said Letters Patent is hereby corrected as shown below:

```
In the Abstract, line 10, delete "place", and
insert ---placed---.
Column 1, line 51, after "problem", insert ---,---.
Column 1, line 57, after "breakers", insert ---,---.
Column 2, line 8, after "invention", insert ---,---.
Column 2, line 13, delete "a", and insert ---of---.
Column 2, line 19, delete "into".
Column 2, line 41, after "is", insert ---a---.
Column 2, line 55, after "6", insert ---,---.
Column 2, line 63, after "therefore", insert ---,---.
Column 4, line 5, delete "no", and insert ---now---.
Column 4, line 18, after "described", insert ---,---.
Column 4, line 21, after "however", insert ---,---.
```

Signed and Sealed this

Twenty-sixth Day of August, 1997

Attest:

BRUCE LEHMAN

Attesting Officer

Commissioner of Patents and Trademarks